United States Patent
Nanbu et al.

(10) Patent No.: US 6,652,413 B2
(45) Date of Patent: Nov. 25, 2003

(54) TRACTION DRIVE ROTARY ASSEMBLY

(75) Inventors: Toshikazu Nanbu, Kanagawa (JP); Nobutaka Chiba, Yokohama (JP); Makoto Kano, Yokohama (JP); Yoshiteru Yasuda, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 72 days.

(21) Appl. No.: 10/078,060

(22) Filed: Feb. 20, 2002

(65) Prior Publication Data

US 2002/0155919 A1 Oct. 24, 2002

(30) Foreign Application Priority Data

Feb. 21, 2001 (JP) .................................. 2001-044950
Nov. 8, 2001 (JP) .................................. 2001-343450

(51) Int. Cl.$^7$ .............................................. F16H 55/32
(52) U.S. Cl. .............................. 476/73; 476/72; 82/104
(58) Field of Search ........................ 476/72, 73; 82/104

(56) References Cited

U.S. PATENT DOCUMENTS

| 2,786,363 | A | * | 3/1957 | Davies et al. ................. 476/40 |
| 2,847,861 | A | | 8/1958 | Weisel ........................ 74/190.5 |
| 6,165,100 | A | * | 12/2000 | Mitamura et al. ............. 476/72 |
| 6,196,946 | B1 | * | 3/2001 | Sawai et al. .................. 476/73 |
| 2002/0014639 | A1 | * | 2/2002 | Hatase et al. ................. 476/73 |

OTHER PUBLICATIONS

Japanese Industrial Standard (JIS B 0601), "Surface Roughness—Definitions and Designation," B 0601–1994, pp. 1–25.

Japanese Industrial Standard Handbook, "Ferrous Materials and Metallurgy," Japanese Standards Association, pp. 1691–1695; 2014–2018, 1988.

Japanese Industrial Standard (JIS G 4052), "Structural Steels with Specified Hardenability Bands," Japanese Standards Association, pp 542–543, and 561, 1979.

Japanese Industrial Standard (JIS G 4105), "Chromium Molybdenum Steels," Japanese Standards Association, pp. 1–11, 1979.

* cited by examiner

*Primary Examiner*—David Fenstermacher
(74) *Attorney, Agent, or Firm*—Foley & Lardner

(57) ABSTRACT

A traction drive rotary assembly including a plurality of rolling elements having traction contact surfaces associating with each other to transmit power between the rolling elements. At least one of the traction contact surfaces has a surface microstructure including grooves and protrusions alternately arranged. The surface microstructure is represented by an unfiltered primary profile curve including recesses and projections corresponding to the grooves and the protrusions. Each projection includes a portion located higher than a center line of the unfiltered primary profile curve and having a shape selected from a generally trapezoidal shape with rounded corners, a generally crowning shape, a generally elliptic arc shape, a generally sinusoidal shape and a generally triangular shape with a rounded apex. A ratio $\lambda$/AMP of a wavelength $\lambda$ of the unfiltered primary profile curve to a half depth AMP of the recess is in a range of 50–400.

25 Claims, 12 Drawing Sheets

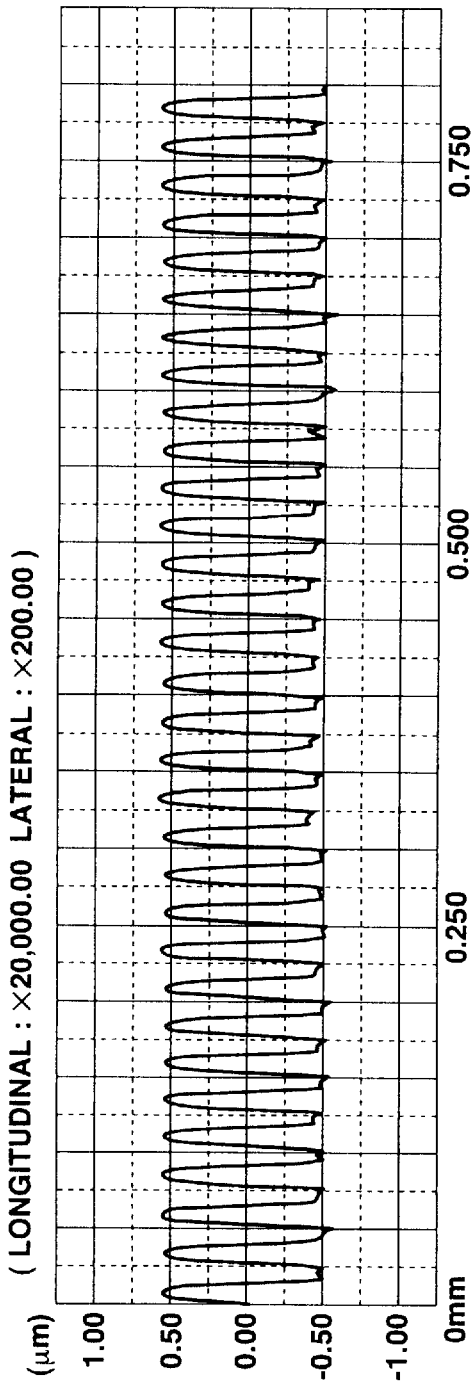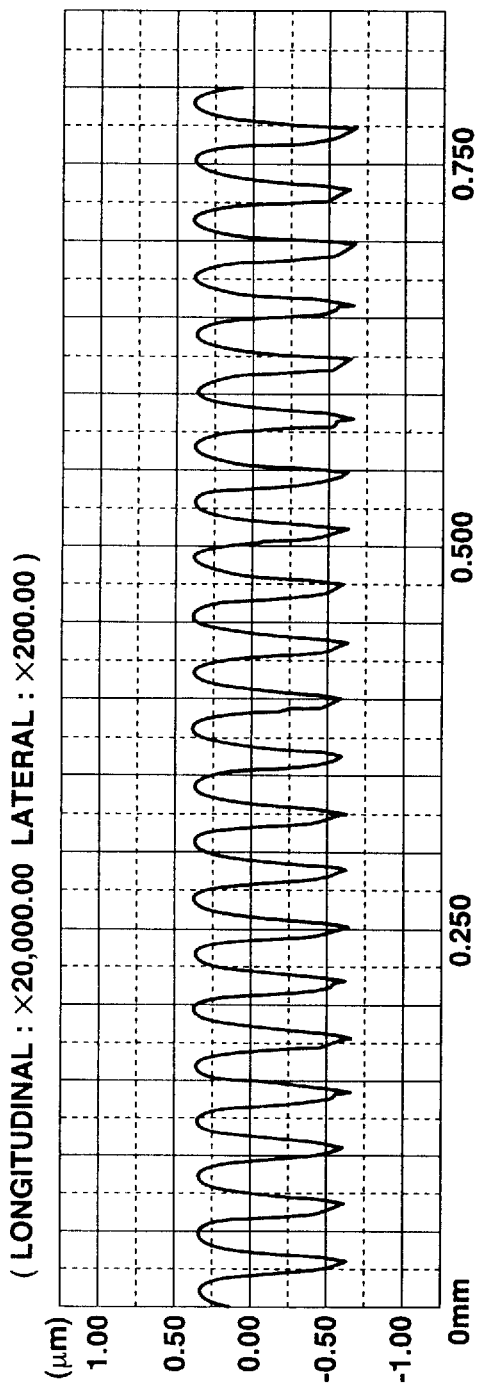

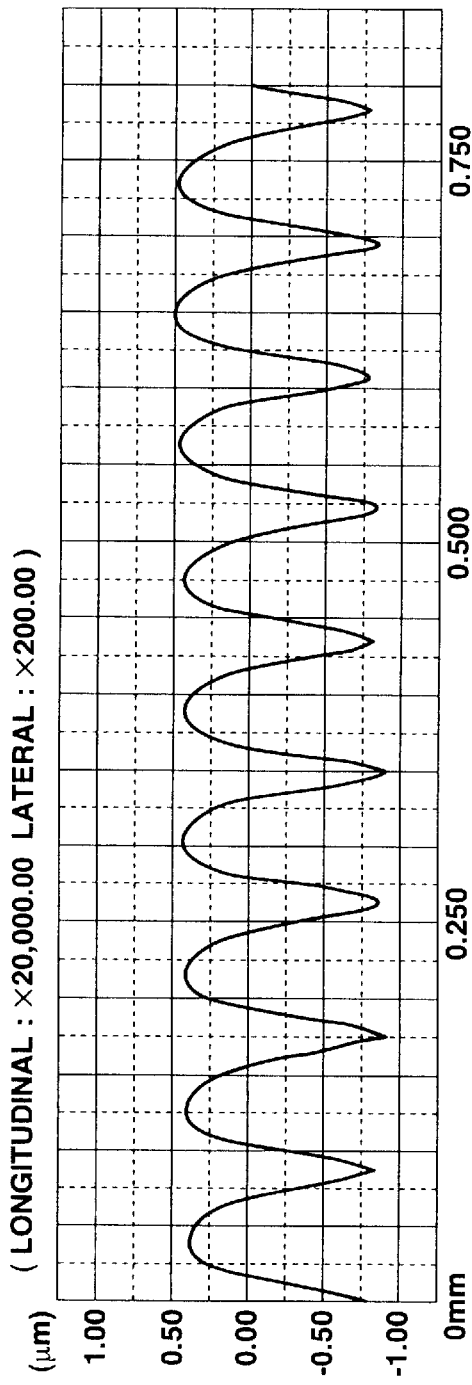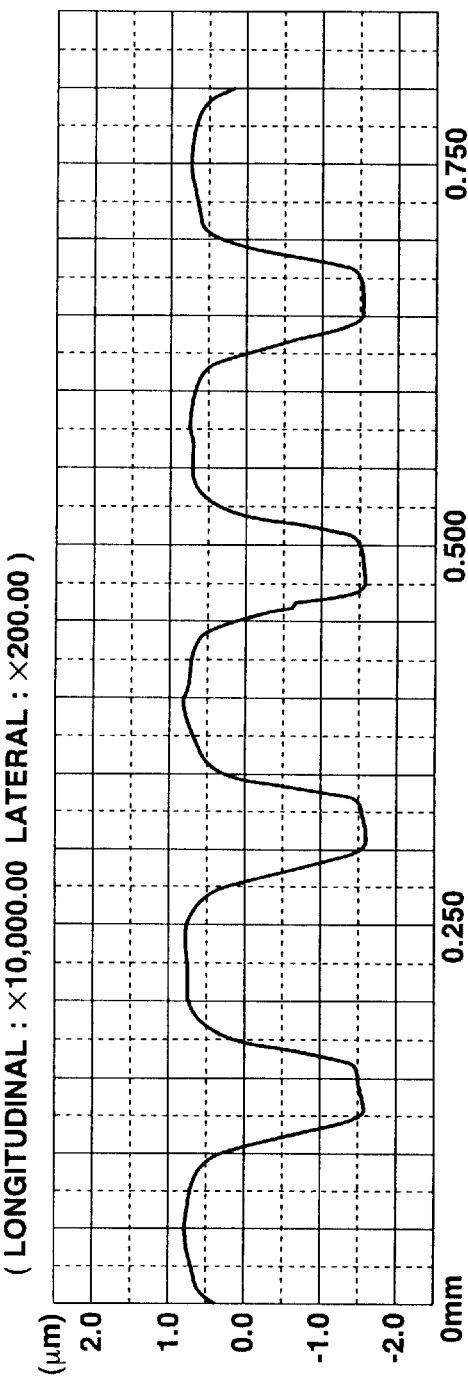

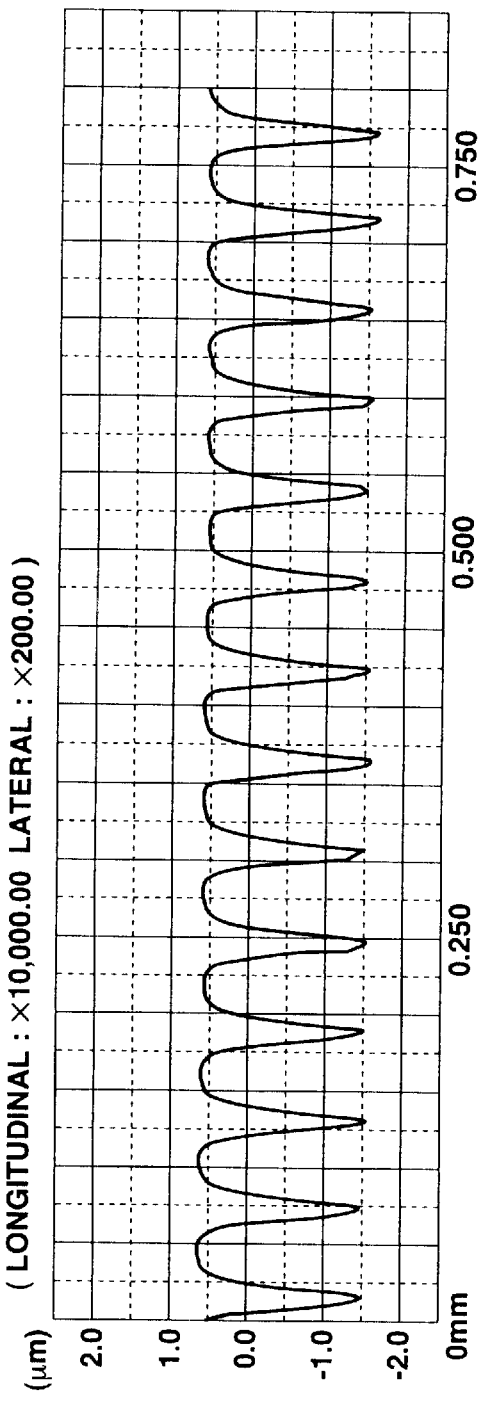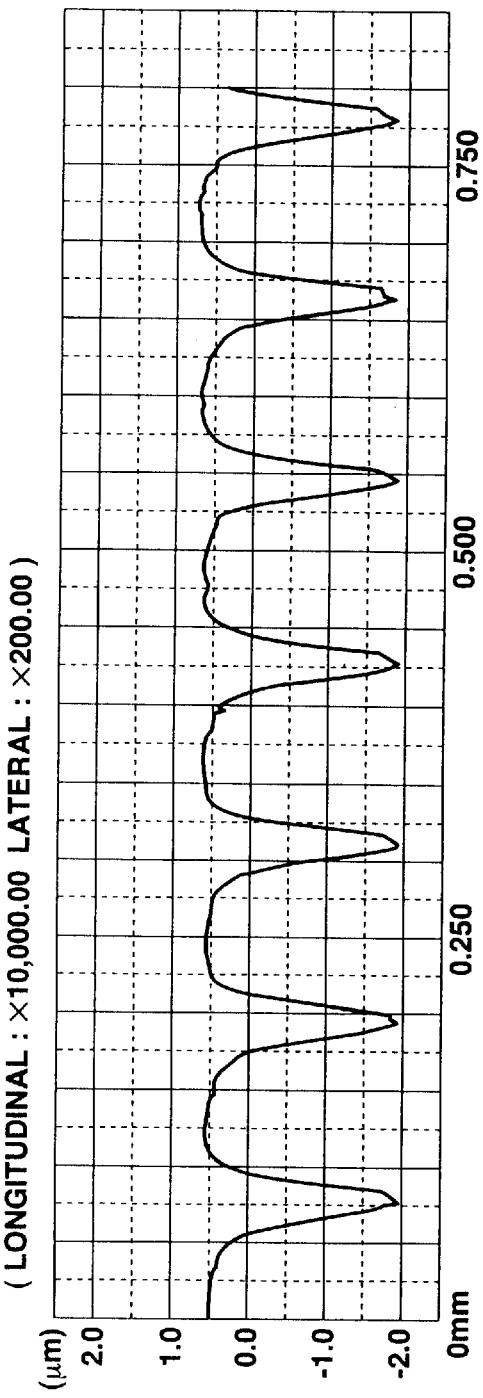

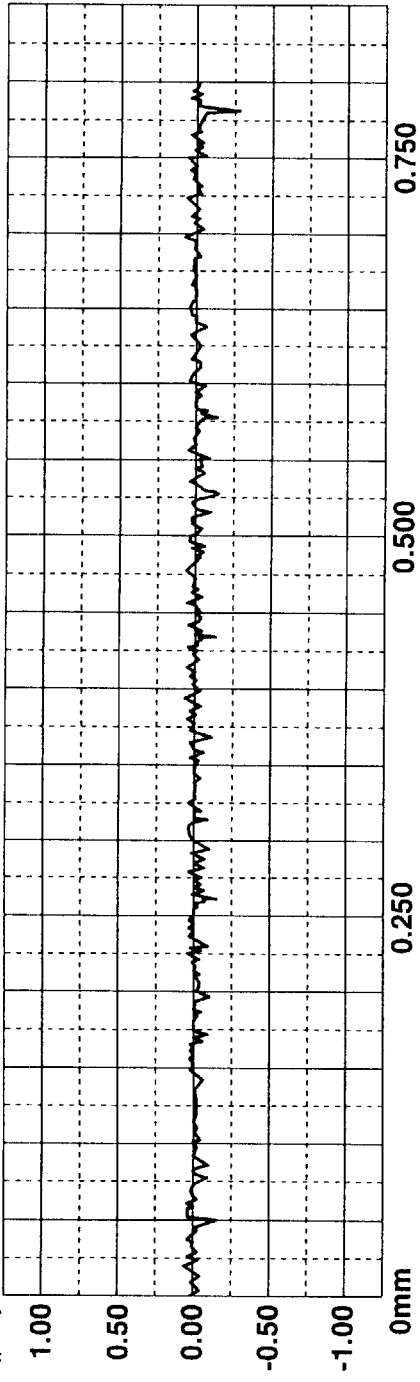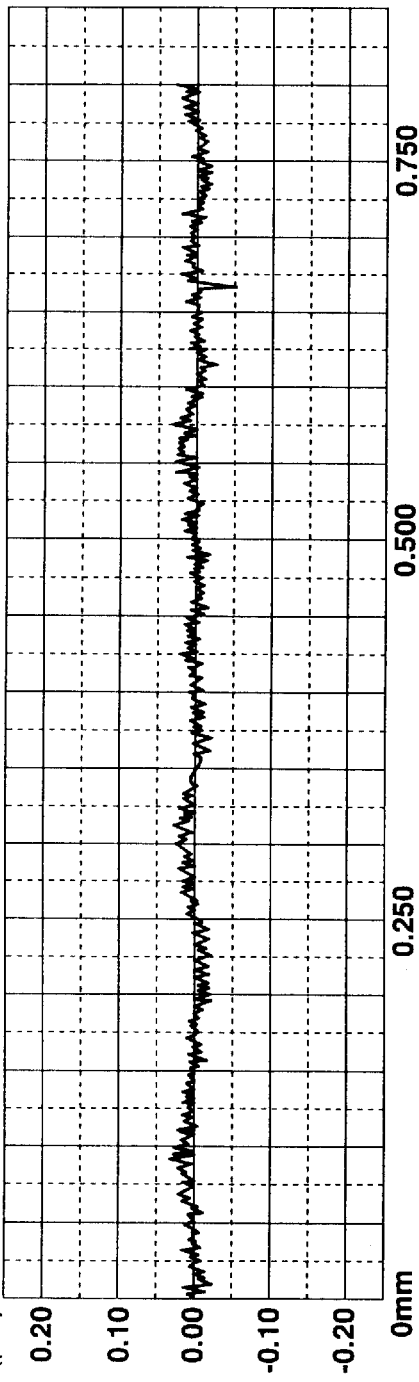

TRACTION DRIVE ROTARY ASSEMBLY

BACKGROUND OF THE INVENTION

The present invention relates to a continuously variable transmission (CVT) for traction drives which is used to transmit rotation from an input side to an output side while continuously varying the speed by traction drive in a power transmission device of an automobile, industrial machinery and so forth. More particularly, this invention relates to a traction drive rotary assembly including a rolling element having a traction contact surface that can exhibit excellent traction properties.

CVTs have been variously researched because of their excellent power transmission properties and absence of speed-change shock. In particular, researches have been conducted on systems (traction drive system: rolling contact system) that transmit power between traction contact surfaces by means of traction oil in order to transmit large power.

The traction drive system has a mechanism applicable to high-power engines. FIG. 1 shows a basic structure of traction drive CVTs. Traction drive CVT 1 includes two metal rolling elements, namely, two disks coaxially arranged, namely, input disk 3 circumferentially fixed on input shaft 2 and output disk 5 circumferentially fixed on output shaft 4, and power rollers 6 interposed between input and output disks 3 and 5. Input and output disks 3 and 5 are rotatable about axes, respectively. Input and output disks 3 and 5 have annular concave traction contact surfaces 3a and 5a, respectively. Traction contact surfaces 3a and 5a form a toroidal cavity in which each power roller 6 is disposed. Power roller 6 has annular convex traction contact surface 6a contacted with traction contact surfaces 3a and 5a of input and output disks 3 and 5 via traction oil. Power roller 6 is rotatable so as to transmit the torque from input disk 3 and output disk 5. Power roller 6 is also adapted to swing about a pivot perpendicular to the rotation axis and thus pivotally move on traction contact surfaces 3a and 5a of input and output disks 3 and 5. As power roller 6 swings, the contact between traction contact surface 6a of power roller 6 and traction contact surfaces 3a and 5a of input and output disks 3 and 5 is displaced. This causes change in a ratio of the torque radius of input disk 3 to that of output disk 5 to thereby continuously change the speed-change ratio. Such a traction drive CVT is disclosed in Japanese Patent Application First Publication No. 62-251559, which is incorporated by reference herein. Traction drive CVT 1 shown in FIG. 1 is a so-called half-toroidal CVT.

SUMMARY OF THE INVENTION

The rolling elements of the traction drive CVT, namely, input disk 3, output disk 5 and power roller 6 as shown in FIG. 1, are required to have excellent traction properties and high rolling fatigue life properties under high temperature and high bearing pressure. In addition, in consideration of the future burden on the environment, it is required that vehicle weight be reduced to achieve further improvement of fuel economy. In order to meet the requirement, a unit size of the traction drive CVT must be reduced. In the case of units of the same size, it is necessary to increase the power that can be transmitted.

In consideration of the problems of the related art described above, the object of the present invention is to provide a traction drive rotary assembly capable of transmitting large power and having excellent traction properties.

According to one aspect of the present invention, there is provided a traction drive rotary assembly for transmission power via traction oil, the traction drive rotary assembly comprising:

a plurality of rolling elements including traction contact surfaces associating with each other to transmit the power between the rolling elements, at least one of the traction contact surfaces having a surface microstructure including grooves and protrusions alternately arranged, the surface microstructure being represented by an unfiltered primary profile curve that includes recesses and projections corresponding to the grooves and the protrusions, respectively, each projection including a portion located higher than a center line of the unfiltered primary profile curve, the portion having a shape selected from a generally trapezoidal shape with rounded corners, a generally crowning shape, a generally elliptic arc shape, a generally sinusoidal shape and a generally triangular shape with a rounded apex, wherein a ratio $\lambda$/AMP of a wavelength $\lambda$ of the unfiltered primary profile curve to a half depth AMP of each recess is in a range of 50–400.

According to a further aspect of the present invention, there is provided a continuously variable transmission for traction drives, comprising:

input and output disks arranged rotatably and coaxially, the input and output disks having annular concave traction contact surfaces; and power rollers rotatably disposed between the input and output disks, the power rollers each having an annular convex traction contact surface contacted with the traction contact surfaces of the input and output disks, the power rollers being pivotally moveable on the traction contact surfaces of the input and output disks, the traction contact surface of at least one of the input and output disks and the power rollers having a surface microstructure including grooves and protrusions alternately arranged, the surface microstructure being represented by an unfiltered primary profile curve that includes recesses and projections corresponding to the grooves and the protrusions, respectively, each projection including a portion located higher than a center line of the unfiltered primary profile curve, the portion having a shape selected from a generally trapezoidal shape with rounded corners, a generally crowning shape, a generally elliptic arc shape, a generally sinusoidal shape and a generally triangular shape with a rounded apex, wherein a ratio $\lambda$/AMP of a wavelength $\lambda$ of the unfiltered primary profile curve to a half depth AMP of each recess is in a range of 50–400.

BRIEF DESCRIPTION OF THE DRAWINGS

FIG. 3 is a graph showing an unfiltered primary profile curve of a traction contact surface of a driven-side rolling element used in Example 1;

FIG. 4 is a graph showing an unfiltered primary profile curve of a traction contact surface of a driven-side rolling element used in Example 2;

FIG. 7 is a graph showing an unfiltered primary profile curve of a traction contact surface of a driven-side rolling element used in Example 5;

FIG. 8 is a graph showing an unfiltered primary profile curve of a traction contact surface of a driven-side rolling element used in Example 6;

FIG. 11 is a graph showing an unfiltered primary profile curve of a traction contact surface of a driven-side rolling element used in Example 9;

FIG. 12 is a graph showing an unfiltered primary profile curve of a traction contact surface of a driven-side rolling element used in Example 10;

FIG. 17 is a graph showing an unfiltered primary profile curve of a traction contact surface of a driven-side rolling element used in Comparative Example 3;

FIG. 18 is a graph showing an unfiltered primary profile curve of a traction contact surfaces of a drive-side rolling element each used in Examples 1–12 and Comparative Examples 1–2;

DETAILED DESCRIPTION OF THE INVENTION

Figure 1:
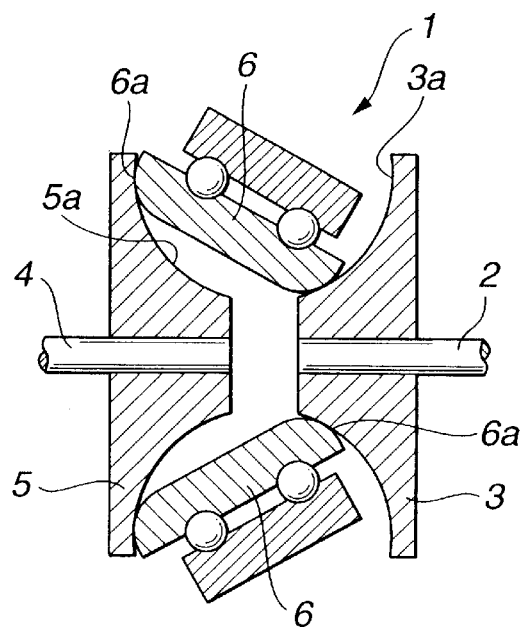
FIG. 1 is a cross-sectional view of a continuously variable transmission (CVT) for traction drives, showing the basic construction.

The traction drive rotary assembly of the present invention includes a plurality of rolling elements having traction contact surfaces that associate with each other for transmitting power between the rolling elements via traction oil. The traction contact surfaces come into rolling contact with each other via a traction oil film formed therebetween to thereby transmit a power between the rolling elements upon actuation of the rotary assembly. At least one of the traction contact surfaces has a surface microstructure including grooves and protrusions alternately arranged. Namely, the traction contact surface of at least one of a drive-side rolling element and a driven-side rolling element has the surface microstructure.

The surface microstructure is represented by an unfiltered primary profile curve in the form of a wavy curve including recesses and projections corresponding to the grooves and protrusions formed in the traction contact surface. The unfiltered primary profile curve is measured using a surface roughness tester and obtained without passing through a filter. Each projection includes a portion having a specific shape, which is positioned higher than a center line of the unfiltered primary profile curve. The center line means a line drawn at a mean height determined by integrally converting the unfiltered primary profile curve in the direction of length. The center line is indicated at C in FIG. 20. The shape of the portion of the projection is selected from a generally trapezoidal shape with rounded corners, a generally crowning shape, a part of a generally elliptic arc shape, a generally sinusoidal shape and a generally triangular shape with a rounded apex. Owing to the specific shape of the projections of the unfiltered primary profile curve, large power can be transmitted, and excellent traction properties and high rolling fatigue life properties can be achieved under high temperature and high contact surface pressure. Further, ratio λ/AMP of wavelength λ of the unfiltered primary profile curve to half depth AMP of the recess thereof is in a range of 50–400. With the provision of the surface microstructure of the traction contact surface, large traction force can be generated while metal-to-metal contact between the traction contact surface and the counterpart can be restricted at a small magnitude. Therefore, the traction drive rotary assembly of the invention can transmit large power therebetween and ensure excellent traction properties. Especially, since the lower limit value of ratio λ/AMP is 50, local stress generated in the traction contact surface can be reduced so that excellent durability can be obtained. At the same time, the upper limit value of ratio λ/AMP is 400, so that traction coefficient can be stably improved.

The plurality of rolling elements include one rolling element having the traction contact surface having the surface microstructure which includes the alternately arranged grooves and protrusions as described above, and the other rolling element having a smooth traction contact surface. The traction contact surface of the one rolling element has a hardness of not less than Hv 800 at a depth of 100 μm from an outer-most surface thereof. In this case, depth of the recesses of the unfiltered primary profile curve of the traction contact surface can be less changed. Therefore, the traction drive rotary assembly of the present invention can exhibit excellent wear resistance and detent resistance.

Further, the traction contact surface of the one rolling element has a hardness of not less than Hv 800 at a depth of 50 μm from the outer-most surface thereof. The traction drive rotary assembly of the present invention can be enhanced in wear resistance and detent resistance.

Furthermore, the traction contact surface of the one rolling element has a residual compressive stress of not less than 800 MPa at a depth of 50 μm from the outer-most surface thereof. The traction drive rotary assembly of the present invention, therefore, can be more enhanced in wear resistance and detent resistance.

The traction contact surface of the one rolling element may be formed by burnishing. In the traction drive rotary assembly of the present invention, the one rolling element having a desired hardness can be readily provided.

Figure 22:
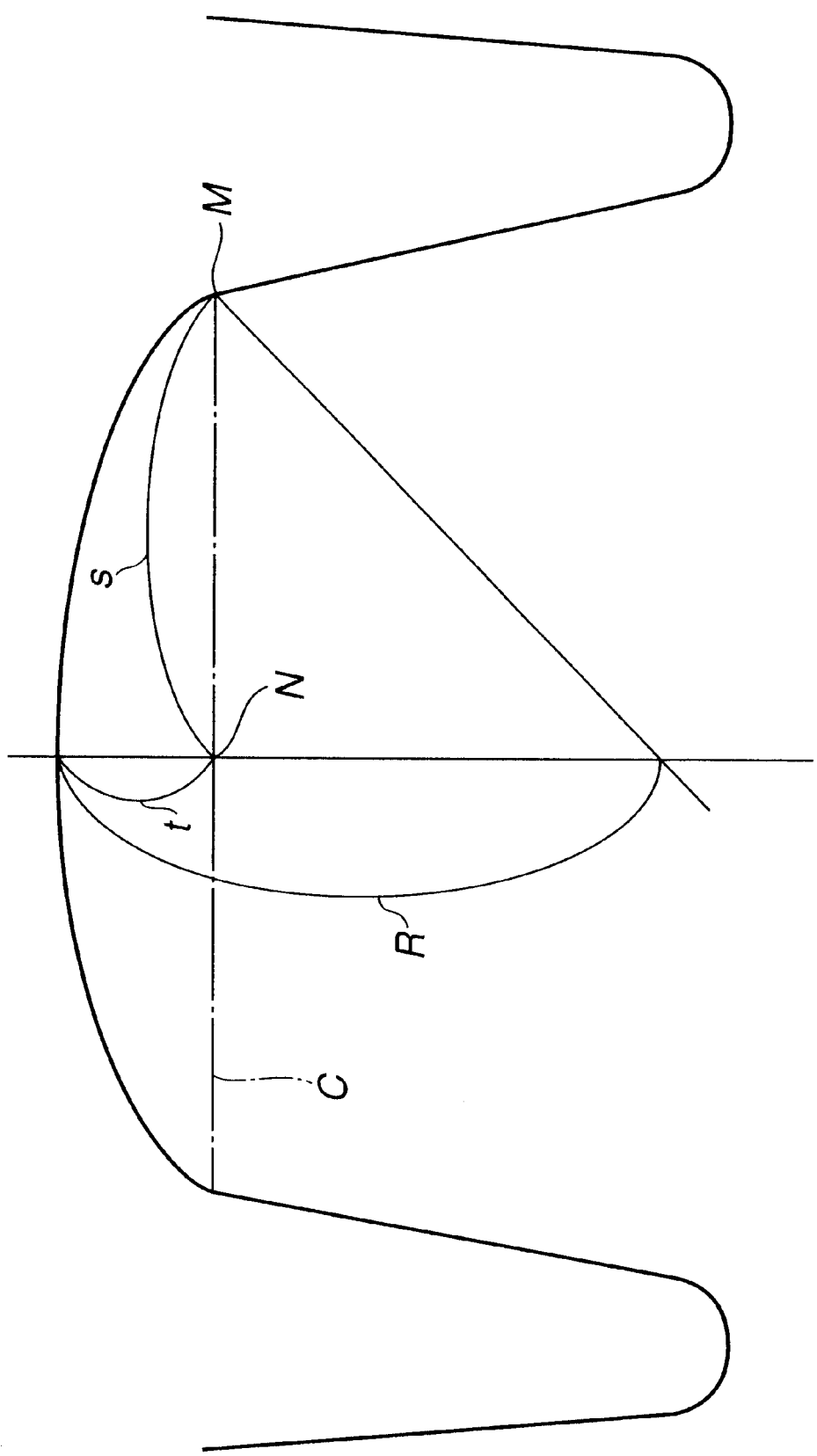
FIG. 22 is an explanatory diagram showing a radius of curvature at a top of the projection of the unfiltered primary profile curve of the traction contact surface of the present invention.

Further, the traction contact surface of the one rolling element has radius of curvature R at a top of each of the projections of the unfiltered primary profile curve which ranges from 1 mm to 8 mm. Radius of curvature R at the top of the projection is shown in FIG. 22 and calculated from the following formula:

$$R = \frac{t^2 + s^2}{2t}$$

wherein
- t represents a distance between the top of the projection and point N at which a vertical line passing through the top of the projection is intersected with center line C of the unfiltered primary profile curve, and
- s represents a distance between point N and point M at which an outer periphery of the projection is intersected with center line C of the unfiltered primary profile curve. Owing to the above-ranged radius of curvature R at the top of the projection, occurrence of edge stress and excessive stress at the projection can be suppressed. The traction drive rotary assembly of the present invention can be enhanced in durability.

The surface microstructure of the at least one of the traction contact surface has plasticity index ψ of 0.2 or less. Plasticity index ψ is expressed by the following formula:

$$\psi = \frac{E'}{H}\sqrt{\frac{\sigma}{\beta}}$$

wherein
- β represents radius of curvature (μm) at top portions of the projections,
- σ represents standard deviation (μm) of dispersion in height between the center line and the top portions of the projections of the unfiltered primary profile curve,
- E' represents equivalent Young's modulus (Pa) of material of the rolling element having the traction contact surface, and
- H represents hardness (Pa) of the material of the rolling element having the traction contact surface. Owing to plasticity index ψ of 0.2 or less, the traction contact surface can exhibit larger traction coefficient, and metal-to-metal contact caused between the traction contact surface and the counterpart can be further reduced. The traction drive rotary assembly of the present invention can be enhanced in durability and traction drive properties.

The top portions of the projections of the unfiltered primary profile curve have a radius of curvature of 0.1 mm or more, and preferably, 0.8 mm or more, when the unfiltered primary profile curve is measured at equal longitudinal and lateral magnifications. More preferably, the radius of curvature of the top portions of the projections is in a range of 0.8–10 mm. As a result, larger traction coefficient can be exhibited. In particular, the lower limit of the range of the radius of curvature is 0.8 mm, so that the effect of reducing the metal-to-metal contact between the traction contact surface and the counterpart can be further enhanced. This can improve durability of the traction drive rotary assembly of the present invention.

Figure 20:
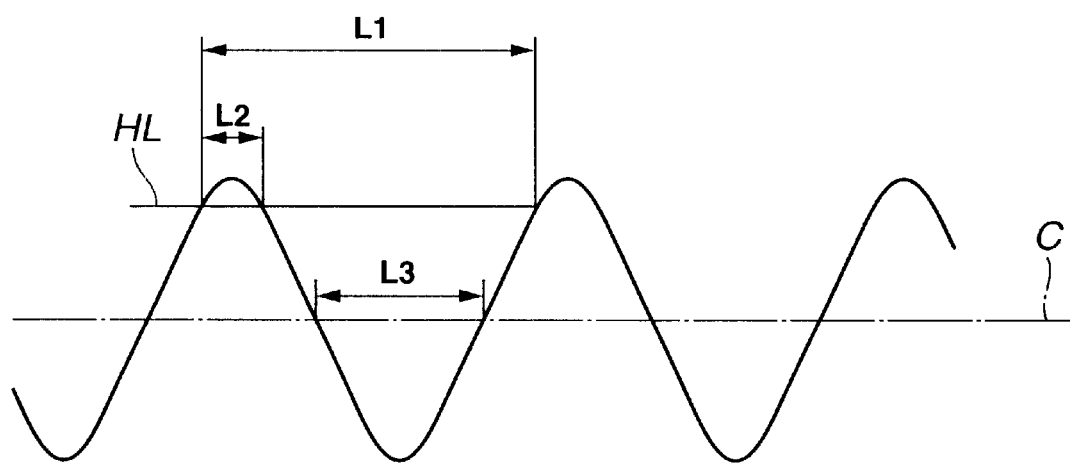
FIG. 20 is an explanatory diagram showing a reference line extending parallel to a center line of an unfiltered primary profile curve of the traction contact surface of the present invention at a predetermined level, and a length of a projection of the unfiltered primary profile curve at the predetermined level.

Referring now to FIG. 20, a relationship between reference length L1 of the unfiltered primary profile curve and length L2 of the projection is explained. Reference length L1 extends parallel to center line C at predetermined level HL that is lower than a top of the projection by 1/10 of a height difference between the top of the projection and a bottom of the recess. Reference length L1 is equivalent to a pitch of the recesses, namely, the wavelength of the unfiltered primary profile curve. Length L2 coextends with reference length L1. Length L2 is a length of the projection at predetermined level HL. Ratio L2/L1 of length L2 of the projection to reference length L1 is in a range of 35–70%. Owing to adjusting ratio L2/L1 within the range of 35–70%, the traction drive rotary assembly of the present invention can ensure larger traction coefficient. Preferably, ratio L2/L1 of length L2 of the projection to reference length L1 is in a range of 50–70%. In this case, the traction drive rotary assembly of the present invention can ensure further increased traction coefficient.

Further, length L2 of the projection is in a range of 7–90 μm, and preferably, 25–80 μm, so that the traction drive rotary assembly of the present invention can exhibit larger traction coefficient.

Figure 21:
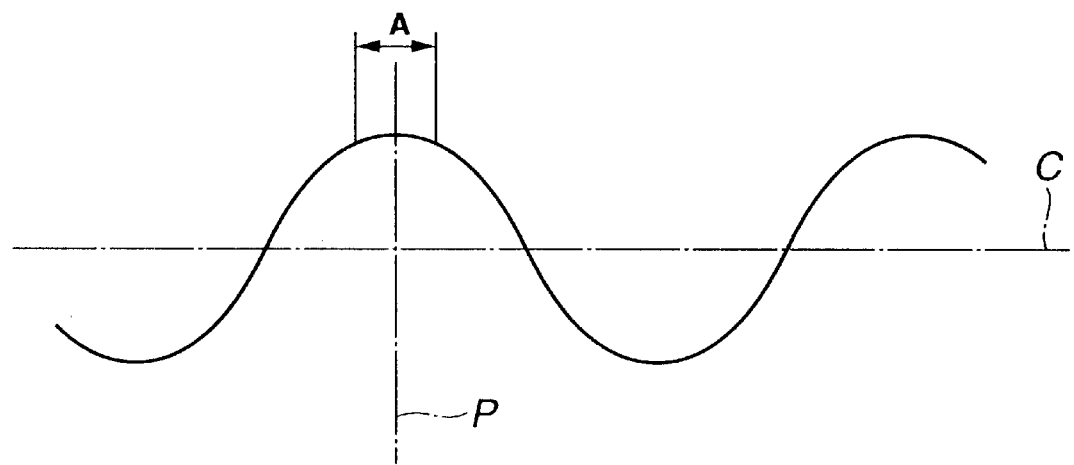
FIG. 21 is an explanatory diagram showing a range at a top portion of the projection of the unfiltered primary profile curve of the traction contact surface of the present invention.

The top portion of the projection of the unfiltered primary profile curve has a ten-point mean roughness Rz of 100 nm or less within a range of 10 μm. The range extends from an apex of the projection in opposed directions along the center line of the unfiltered primary profile curve by substantially an equivalent distance. The range is indicated at A in FIG. 21. The apex of the projection is located on line P extending perpendicularly to center line C. The ten-point mean roughness Rz is measured using an interatomic microscope. The ten-point mean roughness Rz is prescribed in JIS B 0601. As a result, metal-to-metal contact caused between the traction contact surface and the counterpart can be reduced so that influence thereof to the durability of the traction drive rotary assembly can be suppressed. The traction drive rotary assembly of the present invention can exhibit further increased traction coefficient.

Further, the recess of the unfiltered primary profile curve has a length ranging from 10 μm to 40 μm. The length of the recess is indicated at L3 in FIG. 20. The length of the recess is a line segment that is separated from center line C by crossing with the unfiltered primary profile curve. The length of the recess is equivalent to a width of the groove of the surface microstructure of the traction contact surface. Owing to adjusting the length of the recess at the range of 10–40 μm, metal-to-metal contact caused between the traction contact surface and the counterpart can be reduced. This can suppress influence of the metal-to-metal contact to the durability of the traction drive rotary assembly and increase the traction coefficient. As the length of the recess becomes larger than 10 μm within the range, the traction properties of the traction drive rotary assembly can be significantly improved. As the length of the recess becomes smaller than 40 μm within the range, the occurrence of the metal-to-metal contact can be suppressed, and the durability of the traction drive rotary assembly can be remarkably enhanced. In addition, by adjusting the length of the recess within the range of 10–40 μm, discharge of the traction oil can be effectively conducted in the traction drive rotary assembly, and a thickness of the traction oil film formed between the traction contact surface and the counterpart can be suitably retained. Larger traction coefficient can be exhibited, and at the same time, the metal-to-metal contact can be reduced. The traction drive rotary assembly of the present invention can exhibit a long life.

Furthermore, a ratio of a pitch of the recesses of the unfiltered primary profile curve to a diameter of a Hertzian contact ellipse made at a maximum load, is within a range of 1.2–9%. The diameter of the Hertzian contact ellipse extends perpendicular to a rolling direction of the rolling element. By adjusting the ratio of the pitch of the recesses to the diameter of the Hertzian contact ellipse within the range of 1.2–9%, larger traction coefficient can be stably exhibited. Also, influence of metal-to-metal contact between the traction contact surface and the counterpart to the durability of the traction drive rotary assembly can be reduced. Preferably, the ratio of the pitch of the recesses to the diameter of the Hertzian contact ellipse is within the range of 2.4–6%. In this case, excellent traction properties of the traction drive rotary assembly can be more stably obtained.

Further, a ratio of the length of the recess to the diameter of the Hertzian contact ellipse made at the maximum load is within a range of 0.6–2%. The diameter of the Hertzian contact ellipse extends perpendicular to the rolling direction of the rolling element. By adjusting the ratio of the length of the recess within the range of 0.6–2%, larger traction coefficient can be exhibited. Also, a thickness of the traction oil film formed between the traction contact surface and the counterpart can be adequately retained, while discharge of the traction oil can be effectively conducted. Metal-to-metal contact between the traction contact surface and the counterpart can be suppressed, so that a life of the traction drive rotary assembly can be prolonged.

Furthermore, a ratio of the length of the recess to a diameter of the Hertzian contact ellipse made at the maximum load is within a range of 0.8–3.2%. The diameter of the Hertzian contact ellipse extends parallel to the rolling direction of the rolling element. In this case, an effect of reducing influence of the metal-to-metal contact to the durability of the traction drive rotary assembly can be exhibited in addition to the effects of increasing traction coefficient and enhancing retention of the traction oil film thickness, discharge of the traction oil and suppression of the metal-to-metal contact.

The traction contact surface has an annular shape. The grooves of the surface microstructure of the traction contact surface are substantially parallel to each other and form a spiral shape extending along the rolling direction of the rolling element. Further, the grooves each have a length extending longer than at least the diameter of the Hertzian contact ellipse which extends parallel to the rolling direction of the rolling element.

Furthermore, the rolling elements of the traction drive rotary assembly of the invention include a drive-side rolling element and a driven-side rolling element. The traction contact surface of one of the drive-side and driven-side rolling elements has the surface microstructure including grooves and protrusions, and the traction contact surface of the other of the drive-side and driven-side rolling elements has an arithmetical mean roughness Ra of 0.01 μm or less and a maximum height Ry of 0.1 μm or less. The arithmetical mean roughness Ra and the maximum height Ry are prescribed in JIS B 0601. With the provision of the surface roughness, larger traction coefficient can be stably exhibited, and influence of metal-to-metal contact between the traction contact surfaces of the drive-side and driven-side rolling elements to the durability of the traction drive rotary assembly can be lessened.

Upon producing the rolling elements of the traction drive rotary assembly of the present invention, a combination of a material of the rolling element and a heat treatment for the rolling element may be selected from case hardening steel and carburizing-quenching-tempering, case hardening steel and carbonitriding-quenching-tempering, bearing steel and quenching-tempering, bearing steel and carburizing-quenching-tempering, and bearing steel and carbonitriding-quenching-tempering. The combination of the material of the rolling element and the heat treatment can enhance wear resistance of the traction contact surfaces of the rolling elements. As a result, the traction drive rotary assembly of the present invention can ensure excellent traction properties over a long period.

Subsequent to the heat treatment described above, a workpiece made of the above-described material may be subjected to grinding, cutting and recessing by means of a cubic boron nitride (c-BN) tool to form grooves and projecting portions alternately arranged at equal intervals. Next, the workpiece is subjected to tape lapping and grinding to cut away the projecting portions and thus provide the traction contact surface having the surface microstructure that includes the grooves and the protrusions as described above. The unfiltered primary profile curve of the surface microstructure includes the projections having the above-described shape. Namely, the shape of the portion of each projection which is higher than the center line of the unfiltered primary profile curve is the generally trapezoidal shape with rounded corners, the generally crowning shape, the generally elliptic arc shape, the generally sinusoidal shape or the generally triangular shape with a rounded apex.

The traction drive rotary assembly of the present invention can be applied to a half-toroidal CVT as shown in FIG.

1, which includes input and output disks rotatably and coaxially arranged and power rollers rotatably disposed between the input and output disks. The input and output disks have annular concave traction contact surfaces. Each power roller has annular convex traction contact surfaces contacted with the traction contact surfaces of the input and output disks. The power roller comes into rolling contact with the traction contact surfaces of the input and output disks via traction oil. The power roller is pivotally moved on the traction contact surfaces of the input and output disks. Namely, the rolling elements of the traction drive rotary assembly of the present invention are useable as the input and output disks and the power rollers. In this case, large power can be transmitted. Also, the unit size and weight of the toroidal CVT can be reduced, or power output per unit volume and unit weight can be increased.

EXAMPLES

The present invention is described in more detail by way of examples by referring to the accompanying drawings. However, these examples are only illustrative and not intended to limit a scope of the present invention thereto.

Examples 1–12 and Comparative Examples 1–2

Figure 2:
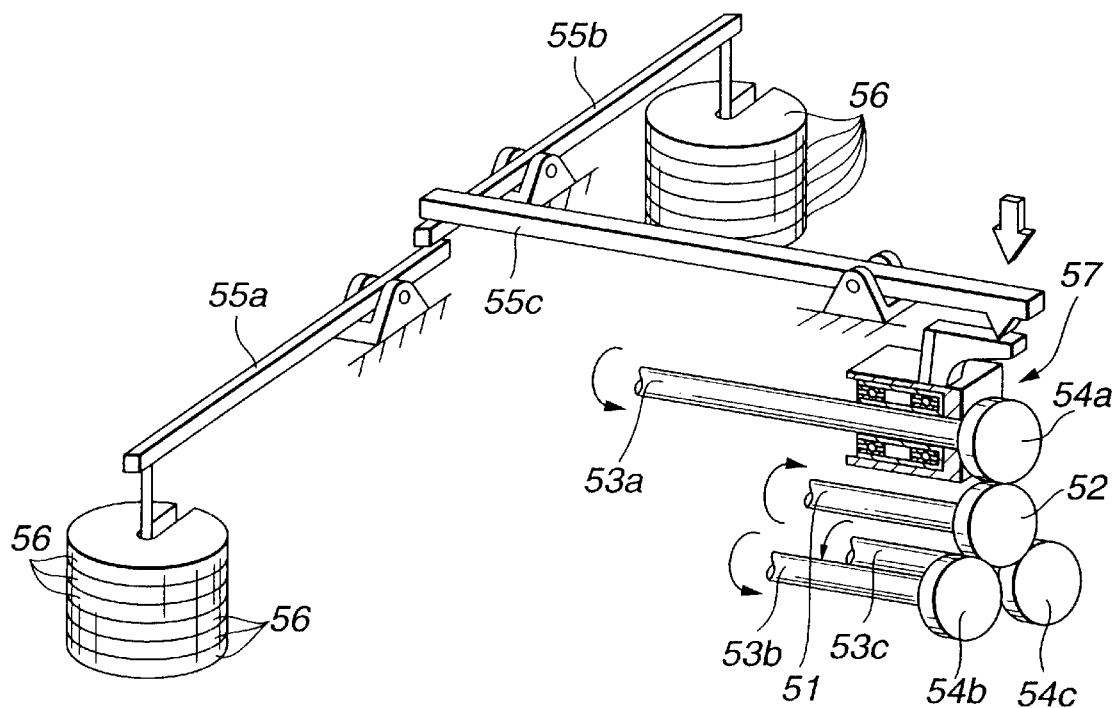
FIG. 2 is a schematic perspective view of a four-cylinder rolling tester.
Figure 5:
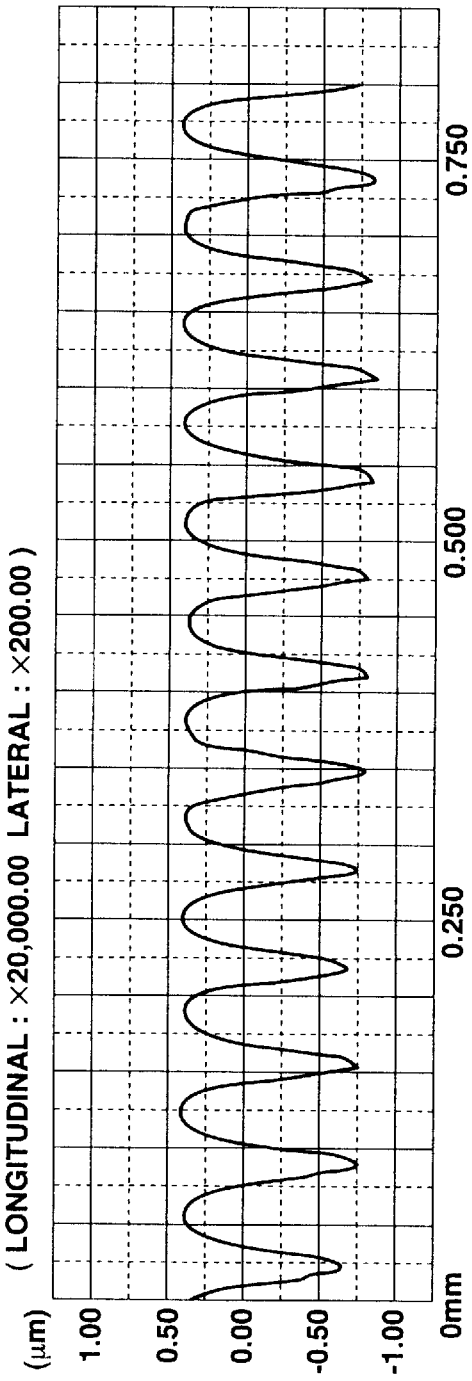
FIG. 5 is a graph showing an unfiltered primary profile curve of a traction contact surface of a driven-side rolling element used in Example 3.
Figure 6:
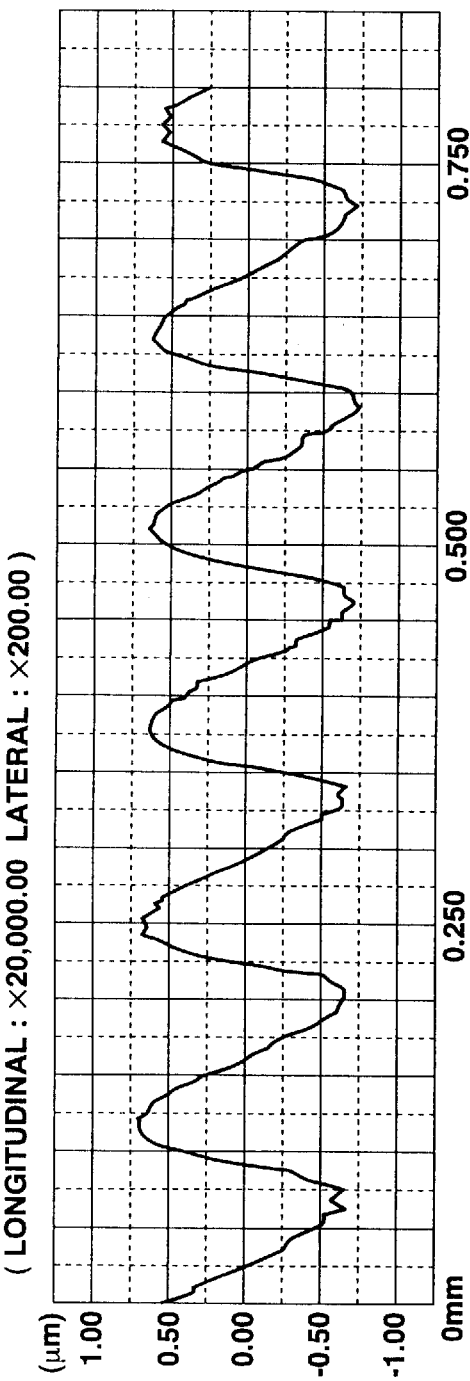
FIG. 6 is a graph showing an unfiltered primary profile curve of a traction contact surface of a driven-side rolling element used in Example 4.
Figure 9:
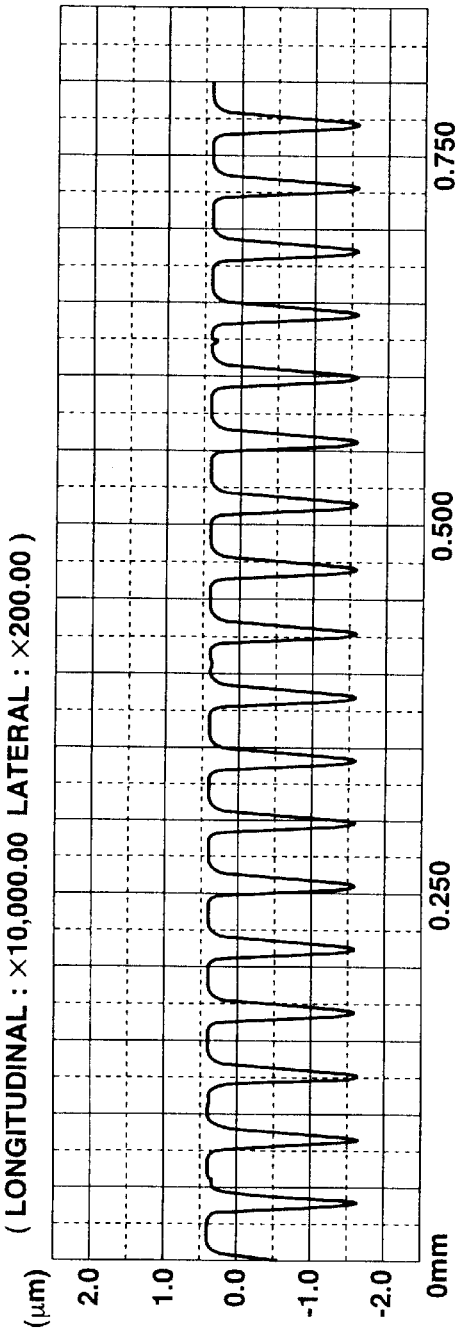
FIG. 9 is a graph showing an unfiltered primary profile curve of a traction contact surface of a driven-side rolling element used in Example 7.
Figure 10:
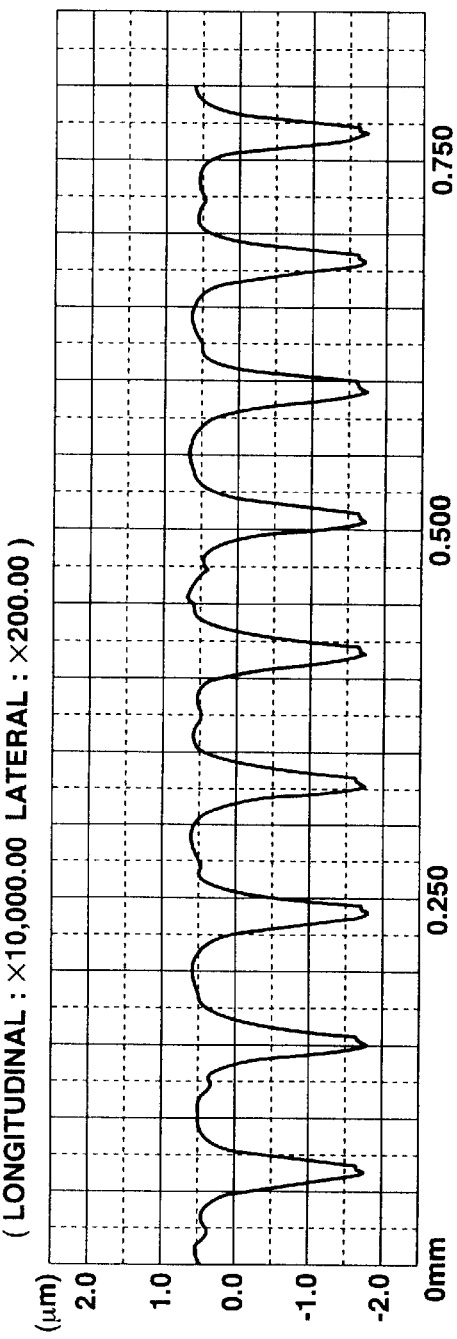
FIG. 10 is a graph showing an unfiltered primary profile curve of a traction contact surface of a driven-side rolling element used in Example 8.
Figure 13:
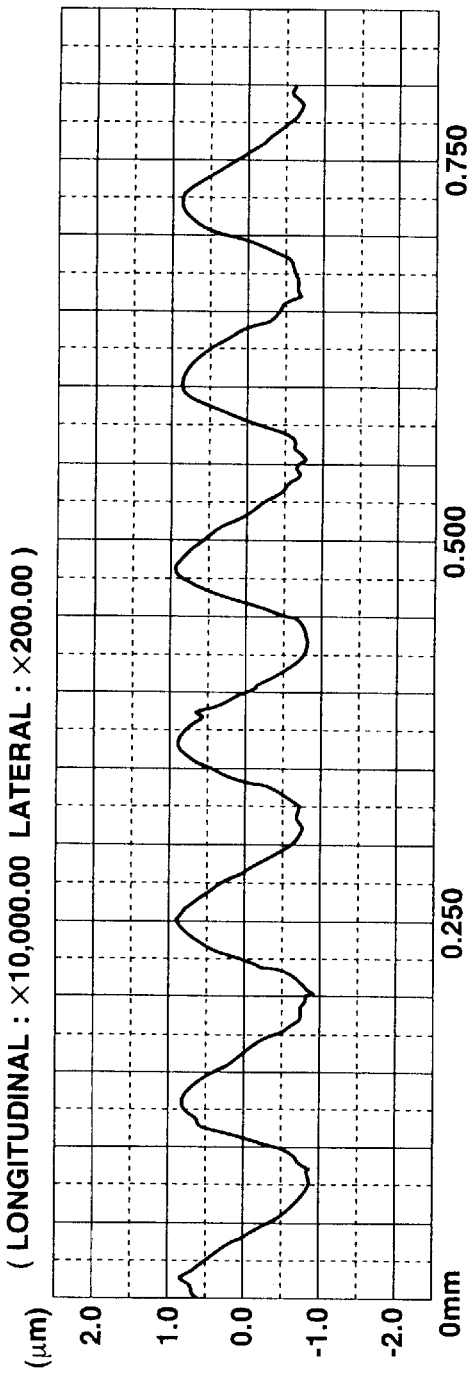
FIG. 13 is a graph showing an unfiltered primary profile curve of a traction contact surface of a driven-side rolling element used in Example 11.
Figure 14:
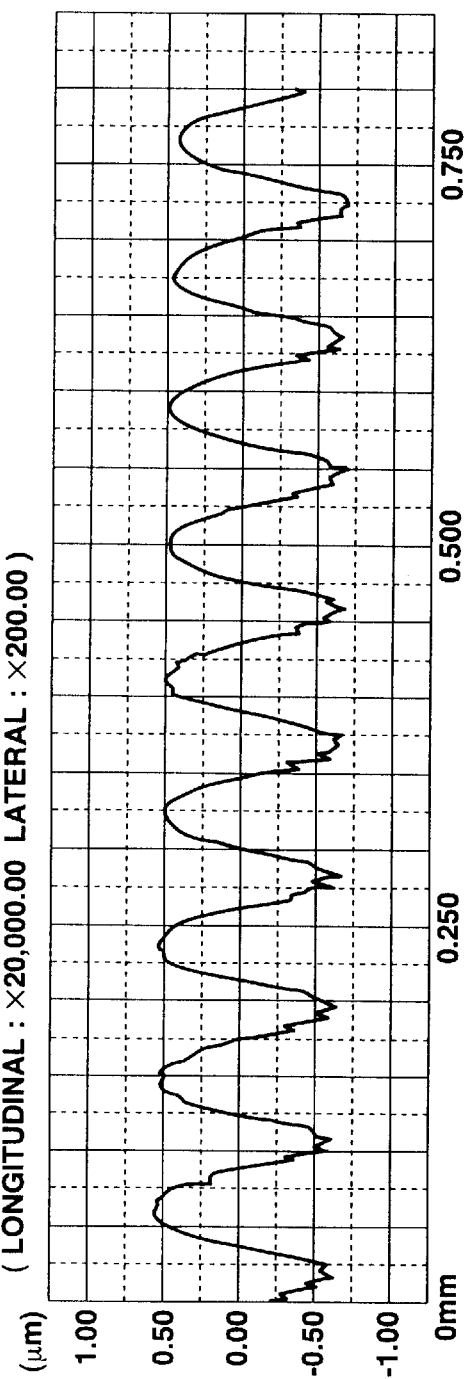
FIG. 14 is a graph showing an unfiltered primary profile curve of a traction contact surface of a driven-side rolling element used in Example 12.

A driven-side rolling element (test piece) and three drive-side rolling elements (test pieces) were prepared and subjected to a rolling/sliding test using a four-cylinder rolling tester shown in FIG. 2. First, the rolling/sliding test is explained hereinafter by referring to FIG. 2. As illustrated in FIG. 2, driven-side rolling element 52 and three drive-side rolling elements 54a–54c are installed in the four-cylinder rolling tester. The four-cylinder rolling tester includes follower shaft 51 supporting driven-side rolling element 52, and three main shafts 53a–53c supporting three drive-side rolling elements 54a–54c. Main shafts 53a–53c are parallel to follower shaft 51 and each other and disposed around follower shaft 51 Drive-side rolling elements 54a–54c are rotatable via a planetary gear set. An outer circumferential surface of driven-side rolling element 52 is brought into rolling contact with outer circumferential surfaces of drive-side rolling elements 54a–54c by applying load to one (53a) of main shafts 53a–53c using a pressure-applying mechanism. The pressure-applying mechanism includes three arms 55a–55c that are arranged to form a T-shape and swingably supported in a vertical direction. Two arms 55a and 55b are linearly arranged with inner ends thereof overlapped in alignment with each other in the vertical direction. Outer ends of arms 55a and 55b suspend weights 56, 56, respectively. Remaining arm 55c has one end disposed on the overlapped inner ends of arms 55a and 55b, and an opposite end contacted with pressure-applying portion 57 provided on main shaft 53a supporting drive-side rolling element 54a. In the thus-constructed four-cylinder rolling tester, right and left weights 56, 56 as viewed in FIG. 2 act on pressure-applying portion 57 via arms 55a–55c so that drive-side rolling elements 54a–54c are pressed onto the outer circumferential surface of driven-side rolling element 52. Torque generated on follower shaft 51 is measured by a torque sensor provided on follower shaft 51.

Traction coefficient was calculated on the basis of results of the torque measurement. Also, a rate of formation of a traction oil film between driven-side rolling element 52 and drive-side rolling elements 54a–54c was calculated by an electric resistance method in order to qualitatively evaluate condition of the contact between driven-side and drive-side rolling elements 52 and 54a–54c. Test conditions were as follows. Slide/roll ratio: 0–3%, average sliding velocity: 30 m/s, and average shaft rotation number: 10000 rpm. Sliding velocity was maintained constant by uniformly applying a differential to follower shaft 51 and main shafts 53a–53c. Traction oil having a temperature of 150° C. was supplied through an inlet in the rolling direction of the rolling elements at a rate of 2 L/min. The traction coefficient and the oil film formation rate were calculated at the slide/roll ratio of 3%.

Driven-side rolling element (test piece) 52 was prepared in the following manner. A workpiece made of a material selected from JIS SCr420 steel, JIS SCM420 steel, JIS SCM420 steel and JIS SUJ2 steel was used. The workpiece was formed into a cylindrical shape having a diameter of 60 mm, a thickness of 10 mm and a cylindrical outer surface. The cylindrical-shaped workpiece was subjected to heat treatments depending on the selected material. The workpiece made of JIS SCr420 steel was subjected to carburizing-quenching-tempering. The workpiece made of JIS SCM420 steel was subjected to carburizing-quenching-tempering or carbonitriding-quenching-tempering. The workpiece made of JIS SUJ2 steel was subjected to quenching-tempering or carbonitriding-quenching-tempering. The heat-treated workpiece was subjected to grinding and then to recessing using a polycrystalline c-BN tool to form grooves on the outer surface. Subsequently, projecting portions disposed between the grooves were cut away by tape lapping to form protrusions and thus provide a traction contact surface having a surface microstructure formed with the grooves and the protrusions alternately arranged.

Drive-side rolling elements (test pieces) 54a–54c were prepared in the following manner. Workpieces made of JIS SUJ2 steel were used. The workpieces were formed into a generally cylindrical shape having a diameter of 60 mm, a thickness of 10 mm and a crowning-shaped outer surface that had a radius of curvature R of 30 mm. Next, the workpieces were subjected to quenching-tempering. The heat-treated workpieces were subjected to grinding and tape lapping to form traction contact surfaces having an arithmetical mean roughness Ra of 0.01 $\mu$m and a maximum height Ry of 0.1 $\mu$m.

Figure 15:
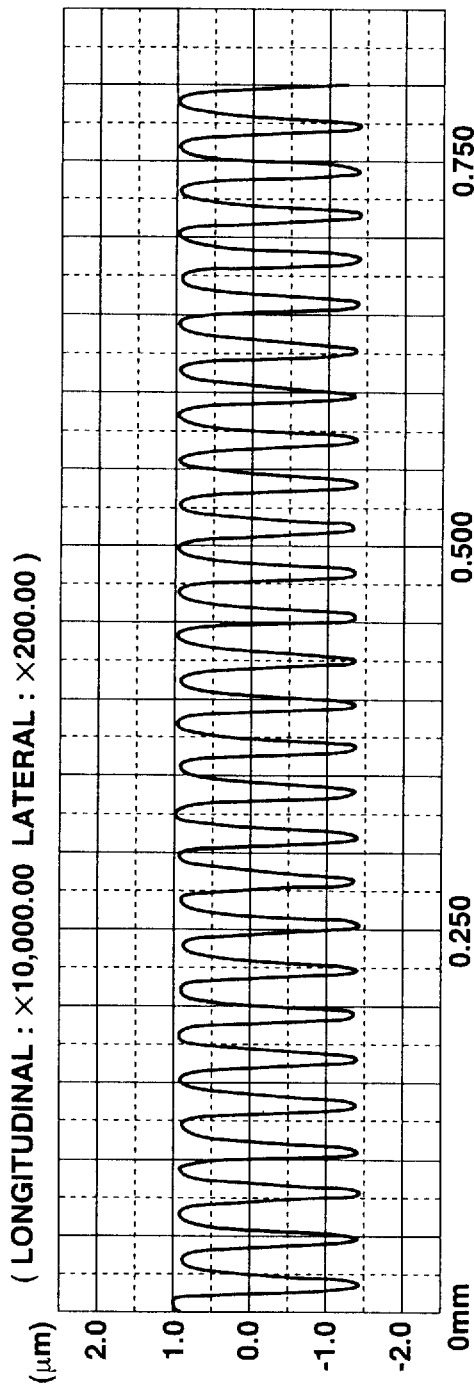
FIG. 15 is a graph showing an unfiltered primary profile curve of a traction contact surface of a driven-side rolling element used in Comparative Example 1.
Figure 16:
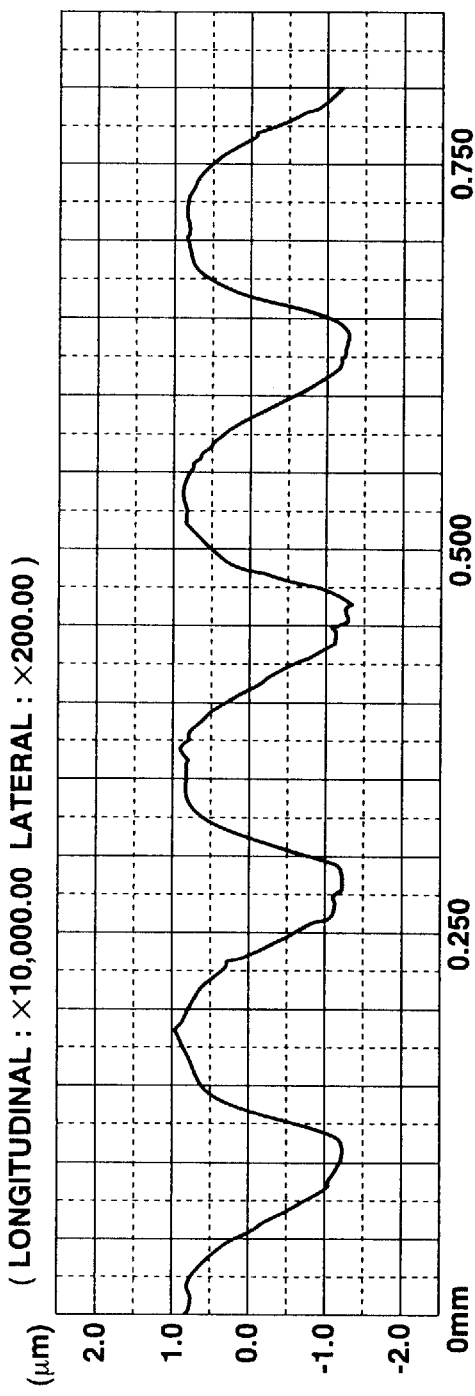
FIG. 16 is a graph showing an unfiltered primary profile curve of a traction contact surface of a driven-side rolling element used in Comparative Example 2.

Unfiltered primary profile curves of the traction contact surfaces of driven-side rolling elements 52 of Examples 1–12 were shown in FIGS. 3–14, respectively. Unfiltered primary profile curves of the traction contact surfaces of driven-side rolling elements 52 of Comparative Examples 1–2 were shown in FIGS. 15–16, respectively. An unfiltered primary profile curve of the traction contact surface of each of drive-side rolling elements 54a–54c of Examples 1–12 and Comparative Examples 1–2 were shown in FIG. 18. The unfiltered primary profile curves of the traction contact surfaces were measured in an axial direction of rolling elements 52 and 54a–54c, namely, in a direction perpendicular to the rolling direction thereof. The measurement was conducted using a tracer type surface roughness tester "Surfcom 1400" produced by Tokyo Seimitsu Co. The tracer of the surface roughness tester had a spherical tip end that had a radius of curvature R of 5 μm and an apical angle of 90 degrees. A measuring length was 1 mm. A surface roughness of a top portion of the projection of the unfiltered primary profile curve was measured using an interatomic microscope, "Nanoscope-IIIa+D3100", produced by Digital Instruments Co. This measurement was carried out at a scan size of 10 μm in an AFM (atomic force microscope) contact mode.

Comparative Example 3

Driven-side rolling element (test piece) 52 was prepared in the following manner. A workpiece made of JIS SUJ2 steel was used. The workpiece was formed into a cylindrical shape having a diameter of 60 mm, a thickness of 10 mm and a cylindrical outer surface. The cylindrical workpiece was subjected to quenching-tempering. The heat-treated workpiece was subjected to grinding and super finishing to form a traction contact surface having an unfiltered primary profile curve shown in FIG. 17.

Figure 19:
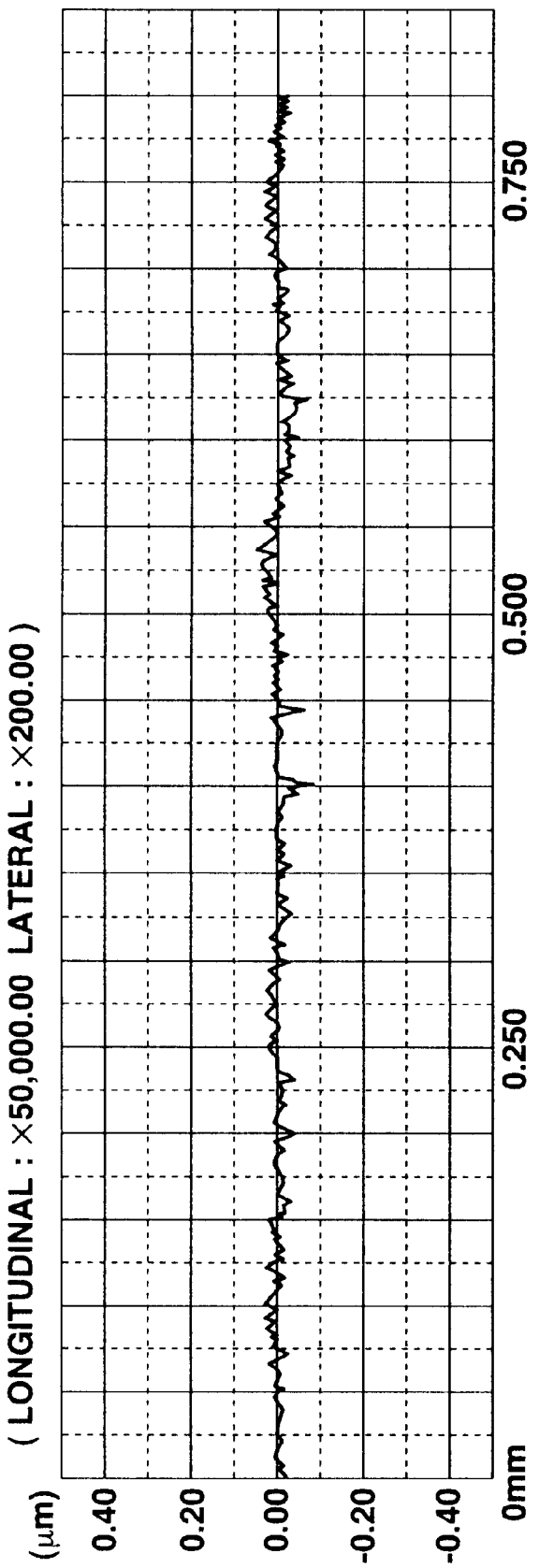
FIG. 19 is a graph showing an unfiltered primary profile curve of a traction contact surface of a drive-side rolling element each used in Comparative Example 3.

Drive-side rolling elements (test pieces) 54a–54c were prepared in the following manner. Workpieces made of JIS SUJ2 steel were used. The workpieces were formed into a generally cylindrical shape having a diameter of 60 mm, a thickness of 60 mm and a crowning-shaped outer surface having a radius of curvature R of 30 mm. Next, the workpieces were subjected to quenching-tempering. The heat-treated workpieces were subjected to grinding and super finishing to form a traction contact surface having an unfiltered primary profile curve shown in FIG. 19.

Thus-prepared driven-side rolling element 52 and drive-side rolling elements 54a–54c were subjected to the rolling/sliding test in the same manner as described in Examples 1–12 and Comparative Examples 1–2.

Examples 13–30 and Comparative Examples 4–5

Driven-side rolling element (test piece) 52 was prepared in the same manner as described in Examples 1–12 and Comparative Examples 1–2, except that a workpiece made of JIS SUJ2 steel was used and subjected to quenching-tempering.

Drive-side rolling elements (test pieces) 54a–54c were prepared in the same manner as described in Examples 1–12 and Comparative Examples 1–2, except that after grinding, the workpieces were subjected to super finishing to form traction contact surfaces having an arithmetical mean roughness Ra of 0.02 μm and a maximum height Ry of 0.12 μm.

Thus-prepared driven-side rolling element 52 and drive-side rolling elements 54a–54c were subjected to the rolling/sliding test in the same manner as described in Examples 1–12 and Comparative Examples 1–2.

Table 1 shows properties of the traction contact surfaces of the rolling elements of Examples 1–30 and Comparative Examples 1–5 and results of the rolling/sliding test carried out in Examples 1–30 and Comparative Examples 1–5.

TABLE 1

| Examples and Comparative Examples | L1[*1] (μm) | Recess depth (μm) | L3[*2] (μm) | L2[*3] (μm) | L3/L1 (%) | L2/L1 (%) | Interruption OK/NG[*4] | λ/AMP[*5] | σ[*6] (μm) | R[*7] at top portion of projection (μm) | Ψ[*8] | Traction coefficient Oil temp.: 150° C. Slide/roll ratio: 3% | Oil film formation rate (%) |
|---|---|---|---|---|---|---|---|---|---|---|---|---|---|
| Example 1 | 25 | 1 | 12.5 | 7.5 | 50.0 | 30.0 | O | 50 | 0.02 | 0.02 | 0.47 | 0.079 | 1 |
| Example 2 | 37 | 1.1 | 15 | 13 | 40.5 | 35.1 | O | 67 | 0.021 | 0.13 | 0.19 | 0.081 | 2 |
| Example 3 | 65 | 1.2 | 28 | 26.5 | 43.1 | 40.8 | O | 108 | 0.02 | 0.05 | 0.29 | 0.074 | 1 |
| Example 4 | 131 | 1.3 | 65 | 27.5 | 49.6 | 20.1 | O | 202 | 0.034 | 1.23 | 0.08 | 0.07 | 8 |
| Example 5 | 175 | 2.3 | 70 | 83.5 | 40.0 | 47.7 | O | 152 | 0.02 | 2.67 | 0.04 | 0.075 | 5 |
| Example 6 | 88 | 2.2 | 30 | 47.5 | 34.1 | 54.0 | O | 80 | 0.02 | 1.00 | 0.07 | 0.08 | 4 |
| Example 7 | 117 | 2.3 | 38 | 65 | 32.5 | 55.6 | O | 102 | 0.034 | 3.20 | 0.05 | 0.078 | 5 |
| Example 8 | 118 | 1.6 | 60 | 23.5 | 50.8 | 19.9 | O | 148 | 0.02 | 0.32 | 0.12 | 0.071 | 7 |
| Example 9 | 131 | 1.2 | 70 | 50 | 53.4 | 38.2 | O | 218 | 0.021 | 1.1 | 0.07 | 0.071 | 8 |
| Example 10 | 129 | 1.7 | 80 | 60 | 62.0 | 46.5 | O | 152 | 0.026 | 2.2 | 0.05 | 0.073 | 5 |
| Example 11 | 200 | 2.05 | 110 | 80 | 55.0 | 40.0 | O | 195 | 0.025 | 3.2 | 0.04 | 0.0716 | 21 |
| Example 12 | 200 | 2.15 | 140 | 100 | 70.0 | 50.0 | O | 186 | 0.03 | 3.3 | 0.05 | 0.0728 | 16 |
| Example 13 | 200 | 3.2 | 155 | 105 | 77.5 | 52.5 | O | 125 | 0.018 | 2.5 | 0.04 | 0.0756 | 7 |
| Example 14 | 200 | 2.3 | 140 | 110 | 70.0 | 55.0 | O | 174 | 0.022 | 8.2 | 0.02 | 0.0716 | 9 |
| Example 15 | 200 | 2.3 | 145 | 100 | 72.5 | 50.0 | O | 174 | 0.028 | 15.0 | 0.02 | 0.0727 | 11 |
| Example 16 | 200 | 3.2 | 140 | 100 | 70.0 | 50.0 | O | 125 | 0.035 | 4.7 | 0.04 | 0.0756 | 9 |
| Example 17 | 200 | 1.4 | 120 | 60 | 60.0 | 30.0 | O | 286 | 0.04 | 5.4 | 0.04 | 0.0695 | 13 |
| Example 18 | 300 | 2.95 | 240 | 140 | 80.0 | 46.7 | O | 203 | 0.02 | 4.5 | 0.03 | 0.0716 | 12 |
| Example 19 | 300 | 5.1 | 260 | 180 | 86.7 | 60.0 | O | 118 | 0.019 | 7.2 | 0.02 | 0.0729 | 7 |
| Example 20 | 300 | 4.85 | 260 | 180 | 86.7 | 60.0 | O | 124 | 0.02 | 8.7 | 0.02 | 0.0736 | 2 |
| Example 21 | 300 | 2.85 | 260 | 130 | 86.7 | 43.3 | O | 211 | 0.025 | 7.8 | 0.03 | 0.0709 | 9 |
| Example 22 | 300 | 4.15 | 240 | 150 | 80.0 | 50.0 | O | 145 | 0.03 | 8.5 | 0.03 | 0.0726 | 7 |
| Example 23 | 300 | 4.3 | 230 | 160 | 76.7 | 53.3 | O | 140 | 0.04 | 5.0 | 0.04 | 0.0728 | 7 |
| Example 24 | 300 | 2.3 | 220 | 180 | 73.3 | 60.0 | O | 261 | 0.015 | 8.5 | 0.02 | 0.0707 | 14 |
| Example 25 | 392 | 4 | 360 | 300 | 91.8 | 76.5 | O | 196 | 0.016 | 11.3 | 0.02 | 0.071 | 7 |
| Example 26 | 436 | 5 | 400 | 320 | 91.7 | 73.4 | O | 174 | 0.026 | 15.0 | 0.02 | 0.07 | 7 |
| Example 27 | 475 | 7 | 425 | 350 | 89.5 | 73.7 | O | 136 | 0.027 | 10.0 | 0.02 | 0.071 | 4 |
| Example 28 | 400 | 2.05 | 350 | 295 | 87.5 | 73.8 | O | 390 | 0.021 | 9.8 | 0.02 | 0.07 | 4 |
| Example 29 | 52 | 0.49 | 40 | 30 | 76.9 | 57.7 | O | 212 | 0.021 | 3.0 | 0.04 | 0.07 | 13 |
| Example 30 | 510 | 8.1 | 440 | 380 | 86.3 | 74.5 | O | 126 | 0.021 | 15.0 | 0.02 | 0.0705 | 4 |
| Com. Example 1 | 29 | 2.4 | 12 | 9.5 | 41.4 | 32.8 | X | 24 | 0.018 | 0.05 | 0.29 | — | 0 |

TABLE 1-continued

| Examples and Comparative Examples | L1[*1] (μm) | Recess depth (μm) | L3[*2] (μm) | L2[*3] (μm) | L3/L1 (%) | L2/L1 (%) | Interruption OK/NG[*4] | λ/AMP[*5] | σ[*6] (μm) | R[*7] at top portion of projection (μm) | Ψ[*8] | Traction coefficient Oil temp.: 150° C. Slide/roll ratio: 3% | Oil film formation rate (%) |
|---|---|---|---|---|---|---|---|---|---|---|---|---|---|
| Com. Example 2 | 59 | 2.5 | 23 | 23 | 39.0 | 39.0 | X | 47 | 0.131 | 0.072 | 0.65 | — | 0 |
| Com. Example 3 | — | — | — | — | — | — | O | — | — | — | — | 0.068 | 15 |
| Com. Example 4 | 300 | 1.3 | 250 | 200 | 83.3 | 66.7 | O | 462 | 0.02 | 8.2 | 0.02 | 0.068 | 13 |
| Com. Example 5 | 100 | 0.35 | 78 | 62 | 78.0 | 62.0 | O | 571 | 0.021 | 5.0 | 0.03 | 0.068 | 10 |

Note:
[*1] . . . pitch of recesses (wavelength)
[*2] . . . recess width on center line
[*3] . . . projection width at 1/10 height difference
[*4] . . . O: Test was completed without interruption.
X: Test was interrupted.
[*5] . . . ratio of wavelength to half depth of recess
[*6] . . . standard deviation of projection height
[*7] . . . radius of curvature
[*8] . . . plasticity index As is apparent from the test results shown in Table 1, better traction coefficients were exhibited in Examples 1–12 as compared with traction coefficients exhibited in Comparative Example 3. Also, it was found that in Examples 1–12, the traction oil film was adequately formed between the traction contact surfaces so that metal-to-metal contact therebetween was reduced. On the contrary, in Comparative Examples 1–2, the traction oil film was not sufficiently formed between the traction contact surfaces, so that metal-to-metal contact therebetween occurred during calculation of the traction coefficients. Due to the occurrence of metal-to-metal contact, the surface roughness of the traction contact surfaces was deteriorated, so that increased vibration of the traction contact surfaces was caused and the rolling/sliding test was interrupted.

Further, it was found that, in Examples 13–30, better traction coefficients were stably exhibited as compared with the traction coefficients exhibited in Comparative Example 3. In Comparative Examples 4–5, the same traction coefficients as those exhibited in Comparative Example 3 were exhibited. Furthermore, in Examples 13–30, owing to the increased pitch of the recesses of the unfiltered primary profile curve, the traction oil film was fully formed between the traction contact surfaces to thereby reduce the metal-to-metal contact therebetween. It was considered that in Examples 13–30, both of the traction coefficient and the oil film formation rate were less affected by the depth of the recess of the unfiltered primary profile curve, because of the increased pitch of the recesses. Therefore, it will be appreciated that the properties of the traction contact surfaces of the rolling elements of Examples 13–30 can be less changed even when the depth of the recess is decreased due to wear caused in the traction contact surfaces during operation of the rolling elements. Further, in Examples 13–30, allowance of a dispersion range of the depth of the recess can be increased because of the increased pitch of the recesses, whereby the formation of the grooves can be readily conducted.

Examples 31–33

A pair of rolling elements (test pieces) were prepared for each Example. One of the rolling elements was prepared in the following manner. A workpiece made of JIS SCM420 steel was formed into a cylindrical shape having a diameter of 26 mm and a cylindrical outer surface. The cylindrical workpiece was subjected to carbonitriding-quenching-tempering. The heat-treated workpiece was subjected to grinding and super finishing, and then to burnishing using silicon nitride balls having a diameter of 6 mm. Burnishing conditions were as follows: Loading force: 100 kgf, and feed rate: 0.1 mm/rev. Subsequently, the workpiece was subjected to recessing using a polycrystalline c-BN tool having a 50 μm cutting edge to form grooves on the outer surface. Next, projecting portions between the grooves were cut away by tape lapping until a traction contact surface having a desired surface microstructure alternately formed with the grooves and the protrusions was provided.

The other of the rolling elements (test pieces) was prepared in the following manner. A workpiece made of JIS SCM435H steel was formed into a crowning shape having a diameter of 130 mm, a thickness of 18 mm and a curved outer surface having R of 30 mm. The crowning-shaped workpiece was subjected to carbonitriding-quenching-tempering. The heat-treated workpiece was subjected to grinding and super finishing to form a traction contact surface having an arithmetical mean roughness Ra of 0.02 μm.

Thus-prepared pair of rolling elements (test pieces) were subjected to a rolling/sliding test in the following manner. The rolling elements were rotated while coming into contact with each other by applying loading force thereto. Test conditions were as follows: Loading force: 1560 kgf, average rolling velocity: 2.85 m/s, and slide/roll ratio: −10%. Slide/roll ratio was expressed by the following formula:

$$(v1-v2)/v2$$

wherein v1 represents circumferential speed (m/s) of the one rolling element having the 26 mm ϕ cylindrical shape, and v2 represents circumferential speed (m/s) of the other rolling element having the 130 mm ϕ crowning shape. Traction oil having a temperature of 90° C. was supplied to the traction contact surfaces of the rolling elements at a rate of 2 L/min. When the one rolling element was rotated 1×10$^6$ times, the rolling/sliding test was stopped and then the one rolling element was subjected to measurement of an unfiltered primary profile curve of a rolling-contact portion of the traction contact surface which was brought into rolling contact with the traction contact surface of the other rolling element during the rolling/sliding test. The measurement was conducted using a surface roughness tester "Surfcom 1400A" produced by Tokyo Seimitsu Co. Then; change in depth of the recesses of the unfiltered primary profile curve of the rolling-contact portion of the one rolling element was calculated by subtracting the depth of the recesses of the unfiltered primary profile curve of the rolling-contact portion thereof which underwent the rolling contact with the traction contact surface of the other rolling element during the rolling/sliding test, from an average depth of recesses of the unfiltered primary profile curve of a non-rolling-contact portion of the traction contact surface of the one rolling element which was out of the rolling contact.

Example 34

One of the two rolling elements (cylindrical test piece) was prepared in the same manner as described in Examples 31–33, except that the workpiece was subjected to ultra fine shot peening between the super finishing and the burnishing. Upon the ultra fine shot peening, steel beads which had an average particle diameter of 50 $\mu$m and a Vickers hardness of Hv 830 were used as shots. Shot peening conditions were as follows: Shooting distance: 200 mm, shooting pressure: 5 kgf/cm$^2$, rotation speed: 2 rpm, and shooting time: 60 sec. The other of the rolling elements (crowning-shaped test piece) was prepared in the same manner as described in Examples 31–33. Thus-prepared pair of rolling elements (test pieces) were subjected to the rolling/sliding test in the same manner as described in Examples 31–33. After the rolling/sliding test, the same measurement and calculation as described in Examples 31–33 were conducted.

Comparative Example 6

One of the two rolling elements (cylindrical test piece) was prepared in the same manner as described in Examples 31–33, except that the cylindrical workpiece was not subjected to the burnishing, the recessing and the tape lapping after the super finishing. The other of the rolling elements (crowning-shaped test piece) was prepared in the same manner as described in Examples 31–33. Thus-prepared pair of rolling elements (test pieces) were subjected to the rolling/sliding test in the same manner as described in Examples 31–33. After the rolling/sliding test, the same measurement and calculation as described in Examples 31–33 were conducted.

Table 2 shows results of Examples 31–34 and Comparative Example 6.

TABLE 2

| Examples and Comparative Example | Recess shape | Recess pitch (μm) | Recess depth (μm) | λ/AMP*1 | Hardening of top portion of projection | Hardness at 5 μm depth*4 (Hv) | Hardness at 50 μm depth*5 (Hv) | Hardness at 100 μm depth*6 (Hv) | R*7 at top of projection (mm) | Residual compressive stress at 50 μm depth*8 (MPa) | Change in recess depth between before and after rolling/sliding test (μm) |
|---|---|---|---|---|---|---|---|---|---|---|---|
| Example 31 | Circumferential groove | 120 | 1.3 | 185 | RLB*2 | 725 | 829 | 860 | 3 | 900 | 0.1 |
| Example 32 | Circumferential groove | 200 | 2 | 200 | RLB*2 | 740 | 810 | 854 | 6 | 1000 | 0.1 |
| Example 33 | Circumferential groove | 120 | 1.7 | 141 | RLB*2 | 750 | 820 | 872 | 3 | 850 | 0.15 |
| Example 34 | Circumferential groove | 120 | 1.7 | 141 | WPC*3 + RLB*2 | 920 | 850 | 865 | 3 | 1200 | 0.05 |
| Comparative Example 6 | Circumferential groove | 120 | 1.7 | 141 | — | 740 | 730 | 725 | 3 | 400 | 0.5 |

Note:
*1 . . . ratio of wavelength to half depth of recess
*2 . . . burnishing
*3 . . . shot peening with shots having minimal diameter
*4 . . . Vickers hardness at depth of 5 μm from outer-most surface of traction contact surface
*5 . . . Vickers hardness at depth of 50 μm from outer-most surface of traction contact surface
*6 . . . Vickers hardness at depth of 100 μm from outer-most surface of traction contact surface
*7 . . . Radius of curvature
*8 . . . Residual compressive stress at depth of 50 μm from outer-most surface of traction contact surface As apparent from Table 2, it was confirmed that the change in depth of the recesses obtained in Examples 31–34 was less than that obtained in Comparative Example 6. Deterioration in properties of the traction contact surface which will be caused due to reduction in recess depth, could be suppressed in Examples 31–34. This indicates that the rolling elements of the present invention can maintain good traction coefficient and stably and continuously exhibit large traction force. On the contrary, in Comparative Example 6, since large change in recess depth occurred, traction coefficient will decrease and time for maintaining good traction coefficient will be shortened as compared with Examples 31–34.

This application is based on Japanese Patent Applications No. 2001-44950 filed on Feb., 21, 2001, and No. 2001-343450 filed on Nov., 8, 2001, the entire contents of which, inclusive of the specification, claims and drawings, are incorporated by reference herein.

Although the invention has been described above by reference to certain examples of the invention, the invention is not limited to the examples described above. Modifications and variations of the examples described above will occur to those skilled in the art, in light of the above teachings. The scope of the invention is defined with reference to the following claims.

What is claimed is:

1. A traction drive rotary assembly for transmitting power via traction oil, the traction drive rotary assembly comprising:
   a plurality of rolling elements including traction contact surfaces associating with each other to transmit the power between the rolling elements, at least one of the traction contact surfaces having a surface microstructure including grooves and protrusions alternately arranged,
   the surface microstructure being represented by an unfiltered primary profile curve that includes recesses and projections corresponding to the grooves and the protrusions, respectively, each projection including a portion located higher than a center line of the unfiltered primary profile curve, the portion having a shape selected from a generally trapezoidal shape with rounded corners, a generally crowning shape, a generally elliptic arc shape, a generally sinusoidal shape and a generally triangular shape with a rounded apex,
   wherein a ratio λ/AMP of a wavelength λ of the unfiltered primary profile curve to a half depth AMP of each recess is in a range of 50–400.

2. The traction drive rotary assembly as claimed in claim 1, wherein the plurality of rolling elements comprise one rolling element having the traction contact surface having the surface microstructure including grooves and protrusions alternately arranged, and the other rolling element having a smooth traction contact surface, the traction contact surface of the one rolling element having a hardness of not less than Hv 800 at a depth of 100 μm from an outer-most surface thereof.

3. The traction drive rotary assembly as claimed in claim 2, wherein the traction contact surface of the one rolling element has a hardness of not less than Hv 800 at a depth of 50 μm from the outer-most surface thereof.

4. The traction drive rotary assembly as claimed in claim 3, wherein the traction contact surface of the one rolling element has a residual compressive stress of not less than 800 MPa at a depth of 50 μm from the outer-most surface thereof.

5. The traction drive rotary assembly as claimed in claim 4, wherein the traction contact surface of the one rolling element is formed by burnishing.

6. The traction drive rotary assembly as claimed in claim 4, wherein the traction contact surface of the one rolling element has a radius of curvature at a top of each of the projections which ranges from 1 mm to 8 mm.

7. The traction drive rotary assembly as claimed in claim 1, wherein the unfiltered primary profile curve is measured using a surface roughness tester.

8. The traction drive rotary assembly as claimed in claim 7, wherein a radius of curvature of top portions of the projections of the unfiltered primary profile curve being in a range of 0.8–10 mm when the unfiltered primary profile curve is measured at equal longitudinal and lateral magnifications.

9. The traction drive rotary assembly as claimed in claim 1, wherein the surface microstructure is represented by a plasticity index $\psi$ of 0.2 or less, the plasticity index $\psi$ being expressed by the following formula:

$$\psi = \frac{E'}{H}\sqrt{\frac{\sigma}{\beta}}.$$

wherein
   β represents radius of curvature at top portions of the projections,
   σ represents standard deviation of dispersion in height between the center line and the top portions of the projections of the unfiltered primary profile curve,
   E' represents equivalent Young's modulus of material of the rolling element having the at least one of the traction contact surfaces, and
   H represents hardness of the material of the rolling element having the at least one of the traction contact surfaces.

10. The traction drive rotary assembly as claimed in claim 1, wherein a ratio of a length of the projection to a reference length of the unfiltered primary profile curve is in a range of 35–70%, the reference length extending parallel to the center line at a predetermined level lower than a top of the projection by 1/10 of a height difference between the top of the projection and a bottom of the recess, the reference length being equivalent to a pitch of the recess, the length of the projection coextending with the reference length.

11. The traction drive rotary assembly as claimed in claim 10, wherein the ratio of the length of the projection to the reference length is in a range of 50–70%.

12. The traction drive rotary assembly as claimed in claim 1, wherein the projection has a length of 7–90 μm extending parallel to the center line as measured at a predetermined level that is lower than a top of the projection by 1/10 of a height difference between the top of the projection and a bottom of the recess.

13. The traction drive rotary assembly as claimed in claim 12, wherein the length of the projection is in a range of 25–80 μm.

14. The traction drive rotary assembly as claimed in claim 1, wherein the projection of the unfiltered primary profile curve includes a top portion having a ten-point mean roughness Rz of 100 nm or less within a range of 10 μm, the range extending from an apex of the projection in opposed directions, the ten-point mean roughness Rz being measured using an interatomic microscope.

15. The traction drive rotary assembly as claimed in claim 1, wherein the recess of the unfiltered primary profile curve has a length ranging from 10 μm to 40 μm, the length of the recess being equivalent to a width of the groove, the length of the recess being a line segment separated from the center line by crossing with the unfiltered primary profile curve.

16. The traction drive rotary assembly as claimed in claim 1, wherein a ratio of a pitch of the recesses to a diameter of a Hertzian contact ellipse made at a maximum load, is within a range of 1.2–9%, the diameter of the Hertzian contact ellipse extending perpendicular to a rolling direction of the rolling element.

17. The traction drive rotary assembly as claimed in claim 16, wherein the ratio of the pitch of the recesses to the diameter of the Hertzian contact ellipse is within a range of 2.4–6%.

18. The traction drive rotary assembly as claimed in claim 1, wherein a ratio of a length of the recess to a diameter of a Hertzian contact ellipse made at a maximum load is within a range of 0.6–2%, the length of the recess being equivalent to a width of the groove, the length of the recess being a line segment separated from the center line by crossing with the unfiltered primary profile curve, the diameter of the Hertzian contact ellipse extending perpendicular to a rolling direction of the rolling element.

19. The traction drive rotary assembly as claimed in claim 1, wherein a ratio of a length of the recess to a diameter of a Hertzian contact ellipse made at a maximum load is within a range of 0.8–3.2%, the length of the recess being equivalent to a width of the groove, the length of the recess being a line segment separated from the center line by crossing with the unfiltered primary profile curve, the diameter of a Hertzian contact ellipse extending parallel to a rolling direction of the rolling element.

20. The traction drive rotary assembly as claimed in claim 1, wherein the at least one of the traction contact surfaces has a generally annular shape, the grooves being substantially parallel to each other and forming a spiral shape extending along a rolling direction of the rolling element.

21. The traction drive rotary assembly as claimed in claim 1, wherein the grooves each have a length longer than at least a diameter of a Hertzian contact ellipse which extends parallel to a rolling direction of the rolling element.

22. The traction drive rotary assembly as claimed in claim 1, wherein the plurality of rolling elements comprise a drive-side rolling element and a driven-side rolling element, the traction contact surface of one of the drive-side and driven-side rolling elements having the surface microstructure including grooves and protrusions alternately arranged, the traction contact surface of the other of the drive-side and driven-side rolling elements having an arithmetical mean roughness Ra of 0.01 μm or less and a maximum height Ry of 0.1 μm or less.

23. The traction drive rotary assembly as claimed in claim 1, wherein a combination of a material of the rolling element and a heat treatment for the rolling element is selected from case hardening steel and carburizing-quenching-tempering, case hardening steel and carbonitriding-quenching-tempering, bearing steel and quenching-tempering, bearing steel and carburizing-quenching-tempering, and bearing steel and carbonitriding-quenching-tempering.

24. The traction drive rotary assembly as claimed in claim 1, wherein the rolling elements constitute a half-toroidal continuously variable transmission, the rolling elements comprising coaxially arranged input and output disks having annular concave traction contact surfaces, and power rollers disposed between the input and output disks, the power rollers each having an annular convex traction contact surface contacted with the traction contact surfaces of the input and output disks, the power rollers being pivotally moveable on the traction contact surfaces of the input and output disks.

25. A continuously variable transmission for traction drives, comprising:

input and output disks arranged rotatably and coaxially, the input and output disks having annular concave traction contact surfaces; and power rollers rotatably disposed between the input and output disks, the power rollers each having an annular convex traction contact surface contacted with the traction contact surfaces of the input and output disks, the power rollers being pivotally moveable on the traction contact surfaces of the input and output disks, the traction contact surface of at least one of the input and output disks and the power rollers having a surface microstructure including grooves and protrusions alternately arranged, the surface microstructure being represented by an unfiltered primary profile curve that includes recesses and projections corresponding to the grooves and the protrusions, respectively, each projection including a portion located higher than a center line of the unfiltered primary profile curve, the portion having a shape selected from a generally trapezoidal shape with rounded corners, a generally crowning shape, a generally elliptic arc shape, a generally sinusoidal shape and a generally triangular shape with a rounded apex, wherein a ratio $\lambda$/AMP of a wavelength $\lambda$ of the unfiltered primary profile curve to a half depth AMP of each recess is in a range of 50–400.

* * * * *